United States Patent [19]
Cross

[11] 3,888,126
[45] June 10, 1975

[54] LIQUID MEASURING APPARATUS

[75] Inventor: David Edward Cross, Folkestone, England

[73] Assignee: Smiths Industries Limited, London, England

[22] Filed: July 11, 1973

[21] Appl. No.: 378,100

[30] Foreign Application Priority Data
July 14, 1972 United Kingdom............ 32934/72

[52] U.S. Cl..................... 73/426; 128/2 F; 128/295
[51] Int. Cl............................................. G01f 19/00
[58] Field of Search ...... 73/426, 226, 222; 128/295, 128/2 F; 137/123

[56] References Cited
UNITED STATES PATENTS

| | | | |
|---|---|---|---|
| 3,312,221 | 4/1967 | Overment........................... | 128/295 |
| R26,964 | 10/1970 | Coanda.............................. | 128/295 |

OTHER PUBLICATIONS
Ingles et al., Review of Scientific Instruments, Vol. 24, No. 7, July, 1953, p. 542.

Primary Examiner—Donald O. Woodiel
Attorney, Agent, or Firm—Elliott I. Pollock

[57] ABSTRACT

Urine-measuring apparatus includes a measuring cylinder of just over 100cc capacity into which a catheter from the patient's bladder drains. Tubing coupled to an outlet at the bottom of the cylinder extends upwardly to just above the 100cc graduation-level and then downwardly to a urine-collection bag below the cylinder so as to provide an automatic siphon by which a unit quantity of 100cc of urine is transferred into the bag each time the cylinder fills to that level from the catheter. The top of the cylinder is vented to ambient atmosphere and a non-return valve is coupled to the end of the tubing within the bag, measurement of the drained urine at any time involving a 'coarse' reading of the bag content made against 100cc graduations of the bag, in combination with a 'fine' reading of the cylinder content made against 1cc graduations of the cylinder.

14 Claims, 4 Drawing Figures

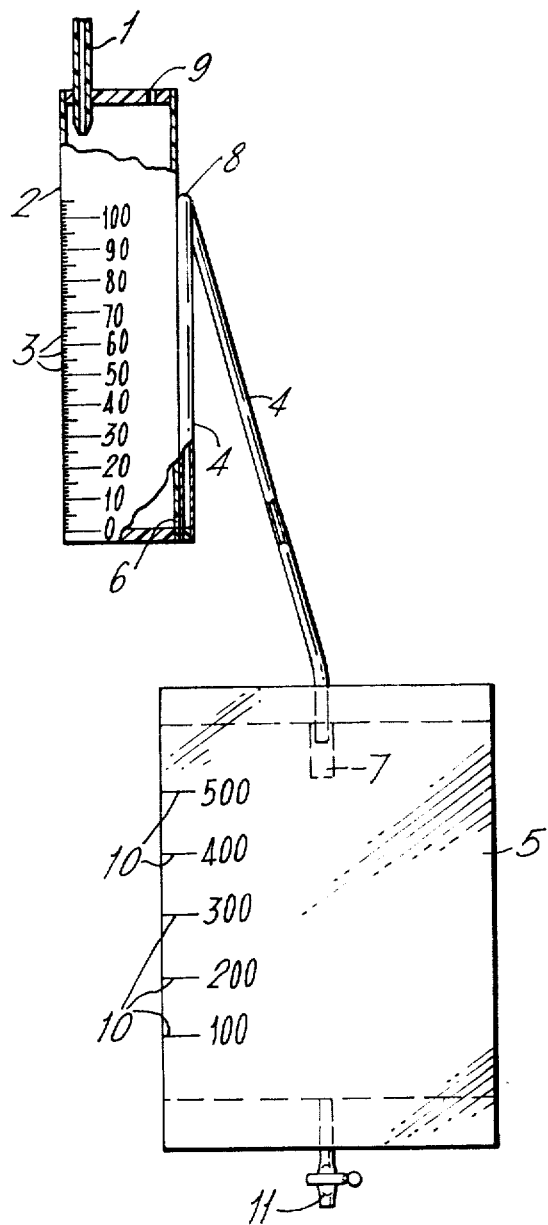
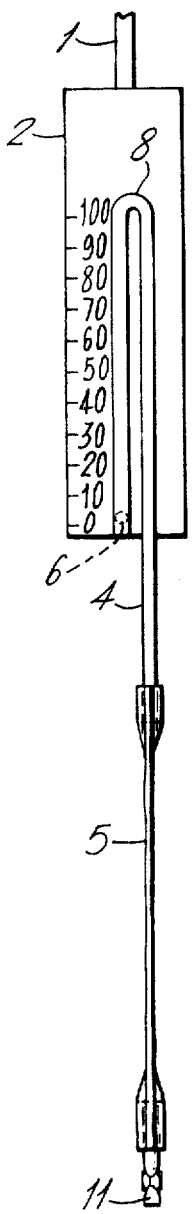

LIQUID MEASURING APPARATUS

This invention relates to liquid-measuring apparatus.

The invention is concerned in particular, though not exclusively with apparatus for providing a measure of the quantity of urine, or other body fluid, drained from a person under medical observation.

Measurement of the quantity, or rate, of drainage of urine from a patient is frequently necessary in the case of burn injury or following surgery. Conventionally, the measurement is made by feeding the urine via a catheter from the patient's bladder directly into a large-capacity container in the form of a bottle or bag. The accuracy with which such a container, a bag especially, can be calibrated and graduated to enable a direct reading of quantity to be made is limited by both practical and economic considerations. Accordingly it is usually the practice where any sensible degree of accuracy is required, to drain the urine from the patient into a finely-graduated burette. Owing to the small capacity of the burette it is necessary to monitor its content closely and to empty it frequently. The burette is emptied, either through a tap at the bottom or by tipping it, whenever the urine reaches an upper measurement level, and the overall measurement is obtained by totalization of successive readings logged from the burette at these times. Concern with this procedure imposes burden on the nurse or other medical attendant, and is wasteful of time. Furthermore the necessary logging and subsequent totalization of the readings is very much open to human error.

It is an object of the present invention to provide liquid-measuring apparatus that may be used to avoid these disadvantages.

According to one aspect of the present invention, liquid-measuring apparatus comprises a first chamber which is for receiving liquid to a predetermined level and which above this level is vented to, or is otherwise adapted for communication with, ambient atmospheric pressure, a second chamber for the liquid having a substantially larger liquid-holding capacity than said first chamber, and a passageway for conveying liquid from the first to the second chamber, said passageway opening from the said first chamber below said level and extending upwardly to said level and then downwardly to said second chamber so as to provide an automatic siphon for passing a predetermined unit quantity of the liquid out of the said first chamber and into said second chamber via the passageway whenever the liquid content of the said first chamber reaches said level, and wherein said second chamber is graduated in terms of said unit quantity of liquid.

The apparatus of the invention may be used, for example, in minitoring urine drainage from a hospital patient, and in this respect a catheter from the patient's bladder may feed the urine directly into the said first chamber. There will be no transfer of liquid to the second chamber until the said predetermined level of the smaller-capacity, first chamber is reached, whereupon the automatic siphoning action comes into effect; the quantity transferred, which depends on the location below said level of the opening into the passageway from the first chamber, is the same in each case and may be for example, a unit quantity of 100 cc. The successive steps of accumulating the liquid in the first chamber and then transferring it automatically in the unit quantity to the second chamber proceeds as a continuous process, and the total quantity of liquid as for example drained from the patient (or the rate of such drainage), in terms of the transfer-quantity unit, can be readily monitored from the graduations of the second chamber. The first chamber may be graduated in terms of one or more smaller units so that an accurate measurement of the total liquid-quantity involved can be derived from a 'fine' reading taken against the graduations of the first chamber and a 'coarse' reading taken against the graduations of the second chamber.

The apparatus of the present invention has the advantage that it avoids the need for accurate calibration and fine graduation of a container capable of holding the full volume of liquid that is to be involved in the measurement. The calibration and graduation of the relevant container — the second chamber — in the apparatus of the present invention, need only be to an accuracy that will enable discrimination of reading to be made between quantities that differ from one another by the transfer-quantity unit. Accuracy of measurement in this case is achieved by the transfer to the second chamber of liquid, only in the unit quantity defined in relation to the smaller, and therefore more-readily calibrated, first chamber. Furthermore, measurement to any fraction of the defined unit can be readily accommodated by providing appropriate graduation of the first chamber.

The said first chamber may be a liquid-measuring device that is provided as a separate entity from the second chamber and is simply adapted to be coupled to a suitably-graduated larger-capacity chamber to form the combination specified above of the basic liquid-measuring apparatus of the invention. In this connection, the present invention provides in another aspect a liquid-measuring device that comprises a graduated measuring chamber which is for receiving liquid to a predetermined level and which above this level is vented to, or is otherwise adapted for communication with, ambient atmospheric pressure, and a passageway which opens from the said chamber below said level and which extends upwardly to, and then downwardly from, said level to provide an automatic siphon for passing a predetermined unit quantity of the liquid out of the chamber via the passageway whenever the liquid content of the chamber reaches said level, and wherein the graduations of the measuring chamber are in terms of fractional parts of the said unit quantity.

Liquid-measuring apparatus in accordance with the present invention will now be described, by way of example, with reference to the accompanying drawings, in which:

FIG. 1 is a front view, partly in section, of the liquid-measuring apparatus,

FIG. 2 shows the apparatus in side view;

Figure 3:
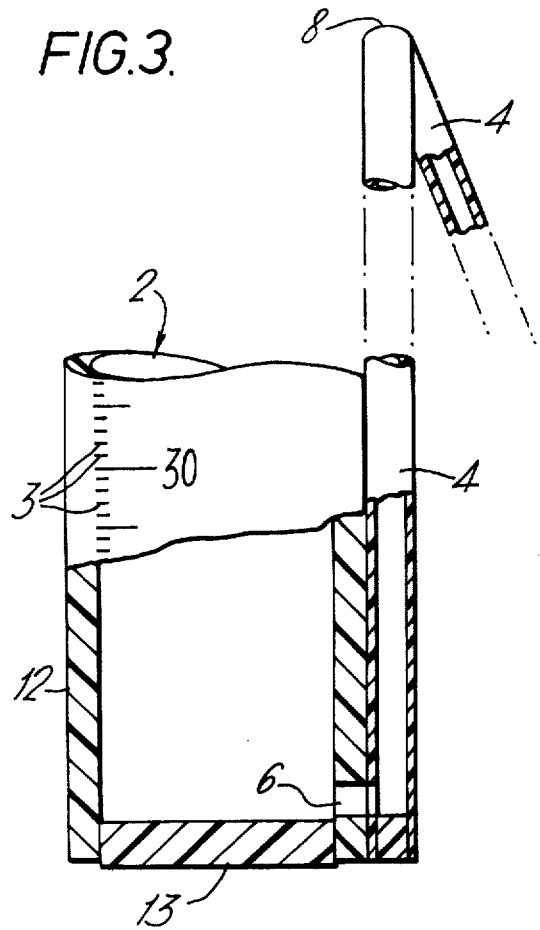
FIG. 3 shows, to enlarged scale and in section, a graduated measuring cylinder and associated tubing that form part of the liquid-measuring apparatus of FIGS. 1 and 2.

The apparatus shown in the drawing is for use in monitoring the quantity of urine draining through a catheter from the bladder of a hospital patient.

Referring to FIGS. 1 to 3, the apparatus receives the urine through an inlet 1 in the top of a substantially rigid and transluscent measuring cylinder 2 that is calibrated from the bottom upwards in terms of cubiccentimetre graduations 3. The range of calibration extends a little (specifically 5cc) beyond 100cc, and the cylinder 2 is coupled by a tube 4 to a transparent flexible-bag 5 having a liquid-holding capacity of some five to six times this. The tube 4 connects an outlet 6 at the bottom of the cylinder 2 to a non-return valve 7 in the top of the bag 5, and in this extends firstly upwardly from the outlet 6 and then downwardly, around a u-shaped bend 8 located at a level just above that of the 100cc graduation.

The top of the cylinder 2 above the U-shaped bend 8 is vented to ambient atmosphere through an air-bleed opening 9 so that as the cylinder 2 fills through the inlet 1, the urine rises up correspondingly in the tube 4. When the level of urine in the cylinder 2 has risen above the 100cc graduation there is overflow round the bend 8 such that with the bag 5 appropriately located below the outlet 6, an automatic siphoning action takes place. By this action substantially all the content of the cylinder 2 is transferred via the tube 4 and the one-way valve 7 into the bag 5. Transfer ceases when the urine in the cylinder 2 falls to the level of the outlet 6, by which time exactly 100cc has been siphoned over.

The diameter of the bore of the ascending arm of the tube 4 extending from the outlet 6 to the bend 8, is substantially larger than that of the descending arm from the bend 8 to the bag 5, and is sufficient to ensure that any air bubbles forming at the end of the transfer, collapse before reaching the bend 8 and are therefore not transferred to the bag 5. The bore-diameter of the ascending arm is also sufficient to provide that the column of urine (nominally 5cc) remaining at the end of the transfer, collapses to collect in the bottom of the tube 4 and in the region of the outlet 6 at the bottom of the cylinder 2. This breaks the siphoning action positively, and avoids creation of an air lock in the tube 4.

As drainage from the patient continues, there is again accumulation of urine in the cylinder 2 until the level reaches the bend 8, whereupon automatic siphoning takes place to empty the cylinder 2 almost completely by transfer of a second unit quantity of 100cc of urine into the bag 5. The successive steps of urine accumulation and automatic transfer to the bag 5 of a unit quantity of 100cc, then repeat again and again as a continuous process throughout the period of drainage. At any time the total quantity that has been transferred is indicated in units of 100cc against graduations 10 in these terms on the wall of the transparent bag 5. This reading taken with the 'fine' reading of the quantity then remaining in the cylinder 2, provides accurate measurement of the drainage from the patient.

The readings, which may be taken quickly and surely without any disagreeable exposure to the urine, are to an accuracy not readily possible from practical or economic considerations, with the bag 5 or any other large-capacity container. The graduations 10 of the bag 5 need not in fact be provided to any higher degree of accuracy than is sufficient to enable discrimination with certainty between successive unit quantities of 100cc. The fine accuracy of the measurement lies in the calibration of the cylinder 2 and the constancy of the automatic transfer process therefrom.

Although the opening 9 for venting the interior of the cylinder 2 to ambient atmospheric pressure, is shown open in FIG. 1, it is preferable in practice to provide a bacterial filter, for example a cotton-wool plug, in this opening so as to maintain sterility and also avoid the danger of ascending infection from the urine to the bladder.

Figure 4:
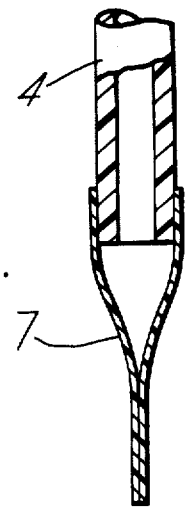
FIG. 4 illustrates the construction of a non-return valve of the apparatus.

The non-return valve 7, which as illustrated in FIG. 4 may consist of a very thin-walled tube that closes in upon itself under anything but internally applied liquid-pressure, serves to prevent reflux or spillage of urine from the bag 5. A tap or, as shown, a releasably clamped outlet tube 11, at the bottom of the bag 5, enables the collected urine to be run off when desired.

The tube 4 as shown, is bonded to the outside of the cylinder 2, up to the U-shaped bend 8, but this is not necessarily so. It might possibly be accommodated for a substantial part of its length within the cylinder 2 itself, and it might even be formed as one with the cylinder 2 as one or more channels in a unitary structure of plastics material provided by a blow-moulding or vacuum-forming process. Provision may however be made for enabling the height of the bend 8 above the outlet 6 to be adjusted (or for a selection to be made from a series of vertically-spaced outlets, of the one that is to be operative as the outlet 6) in order that the transfer-quantity unit may be varied at will. The tube 4, which for example may be of polythene (high or low density), polyvinyl chloride, nylon or polypropylene, is shown as being welded in one piece with the valve 7 into the bag 5, but this also is not necessarily so. A releasable coupling may be used for coupling the tube 4 into the bag 5, so that the cylinder 2 and its tube 4 provide a separate unitary structure. Such a structure may be coupled up to a standard urine-collection bag or to any other suitable (and not necessarily fexible) large-capacity container, for measuring purposes.

The cylinder 2 (together with, or separate from, the tube 4) may be formed in a plastics material by blow moulding or vacuum forming, or as shown more especially in FIG. 3, may be provided by special adaptation of a large-bore tube 12 of, for example, polyvinyl chloride. In the latter respect, closure of the cylinder-bottom is preferably effected by means of a disc 13 inserted in the large-bore tube 12 after the outlet 6 has been punched through its wall. The location of the disc 13 is adjusted before it is sealed in place so as to obtain the minimum spacing below the outlet 6 that is consistent with the achievement of the convenient value of 100cc for the unit quantity of siphon-transfer from the cylinder 2.

Although in the example given above, the transfer-quantity unit is 100cc, it may clearly be arranged to be smaller or larger than this by suitable choice of the dimensioning of the cylinder 2 and the height of the bend 8 above the outlet 6. A smaller quantity unit might well be preferable where, for example, the apparatus is for use in blood-, rather than urine-, measurement.

I claim:

1. Liquid-measuring apparatus comprising a first chamber having an inlet for supplying the liquid to be measured to aa predetermined level in said first chamber, said first chamber communicating with ambient atmospheric presure above said predetermined level, a second chamber for the liquid being measured, said second chamber having a substantially larger liquid-holding capacity than said first chamber, and a passageway intercoupling the two chambers for automatically conveying selected increments of the liquid being measured from the first chamber to the second chamber, said passageway opening into said first chamber below said prdetermined level and extending upwardly to said predetermined level and then downwardly to said second chamber so as thereby to provide an automatic siphon for draining a predetermined unit quantity of the liquid out of the said first chamber and into said second chamber in response to the liquid content of the said first chamber reaching said predetermined level, said second chamber being graduated in terms of said unit quantity of liquid.

2. Apparatus according to claim 1 wherein said first chamber is cylindrical.

3. Apparatus according to claim 1 wherein said second chamber is a bag.

4. Apparatus according to claim 1 including a non-return valve coupled to said passageway for inhibiting passage of liquid up said passageway from said second chamber.

5. Apparatus according to claim 1 wherein said passageway comprises tubing coupled between the said first and second chambers.

6. Apparatus according to claim 1 wherein said first chamber is graduated in terms of fractional parts of the said unit quantity of liquid.

7. A medico-surgical drainage-measuring device for measurement of liquid drained from a patient, comprising a graduated measuring chamber for receiving said liquid to a predetermined level, said chamber above said level being adapted to communicate with ambient atmospheric pressure, and a passageway opening from said chamber below said level, said passageway having a first section extending upwardly to said level and a second section contiguous with said first section extending downwardly from said level to provide an automatic siphon for passing a predetermined unit quantity of the liquid out of the chamber via said opening whenever the liquid content of the chamber reaches said level, said second section including a non-return valve to inhibit reflux of said liquid up said second section, said measuring chamber being graduated in terms of fractional parts of the said unit quantity.

8. A device according to claim 7 wherein said measuring chamber is cylindrical.

9. Urine-measuring apparatus comprising a graduated measuring chamber for receiving liquid to a predetermined level, said chamber above said level being vented to ambient atmospheric pressure, and said chamber having an outlet below said level, a urine-collection bag having a substantially larger urine-holding capacity than said measuring chamber, and tubing coupled to said outlet for conveying urine from said chamber into said bag, said tubing having a first portion extending upwardly from said outlet to said level and a second portion coupled to said first portion to extend downwardly into said bag, whereby said tubing provides an automatic siphon for passing a predetermined unit quantity of urine out of said measuring chamber into said bag whenever the urine content of the said measuring chamber reaches said level.

10. Apparatus according to claim 9 wherein said measuring chamber is graduated in terms of fractional parts of the said unit quantity of urine.

11. Apparatus according to claim 10 wherein said bag is graduated in terms of said unit urine-quantity.

12. A medicosurgical method of providing a measure of a fluid, comprising passing the fluid into a measuring chamber to fill the chamber repeatedly to a predetermined level, providing an automatic siphon for siphoning out from said chamber a predetermined, unit quantity of said fluid whenever the fluid content reaches said level, and deriving a total of the number of times said unit quantity of fluid is siphoned out from said chamber.

13. A method according to claim 12 including the step of collecting the fluid siphoned out from said chamber in a collection chamber, said collection chamber having a substantially larger fluid-holding capacity than said measuring chamber and being graduated in terms of the said unit quantity.

14. A method according to claim 13 wherein said measuring chamber is graduated in terms of fractional parts of the said unit quantity, and said measure is derived as a coarse reading from the said unit-quantity graduations of said collection chamber in combination with a fine reading from the said fractional-graduations of said measuring chamber.

* * * * *